United States Patent
Auer et al.

(10) Patent No.: US 11,581,802 B2
(45) Date of Patent: Feb. 14, 2023

(54) POWER FACTOR CORRECTION CIRCUIT

(71) Applicant: Tridonic GmbH & Co KG, Dornbirn (AT)

(72) Inventors: Hans Auer, Dornbirn (AT); Patrick Marte, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 17/638,306

(22) PCT Filed: Oct. 5, 2020

(86) PCT No.: PCT/EP2020/077850
§ 371 (c)(1),
(2) Date: Feb. 25, 2022

(87) PCT Pub. No.: WO2021/069376
PCT Pub. Date: Apr. 15, 2021

(65) Prior Publication Data
US 2022/0271653 A1    Aug. 25, 2022

(30) Foreign Application Priority Data

Oct. 9, 2019  (EP) .................................... 19202150

(51) Int. Cl.
*H05B 45/37*    (2020.01)
*H02M 1/42*    (2007.01)
(Continued)

(52) U.S. Cl.
CPC ........ *H02M 1/4225* (2013.01); *H05B 45/355* (2020.01); *H02M 1/0058* (2021.05)

(58) Field of Classification Search
CPC ...... H05B 45/30; H05B 45/355; H05B 45/37; H05B 45/38; H05B 47/10; H05B 47/16;
(Continued)

(56) References Cited

U.S. PATENT DOCUMENTS

| 7,116,090 | B1* | 10/2006 | Yang | H02M 1/4225 |
| | | | | 323/284 |
| 7,352,599 | B2* | 4/2008 | Shimada | H02M 1/4225 |
| | | | | 363/79 |

(Continued)

FOREIGN PATENT DOCUMENTS

DE    202014106015    3/2016

OTHER PUBLICATIONS

Sang Hee Kang et al., "Efficiency Optimization in Digitally Controlled Flyback DC-DC Converters Over Wide Ranges of Operating Conditions", IEEE Transactions of Power Electronics, vol. 27, No. 8, Aug. 1, 2012, pp. 3734-3748.

(Continued)

*Primary Examiner* — Thai Pham
(74) *Attorney, Agent, or Firm* — Andrus Intellectual Property Law, LLP

(57) ABSTRACT

The invention relates to a power factor correction (PFC) circuit (20), comprising an inductor (21) which is configured to provide a discharge current, a capacitor (23) which is connected to the inductor (21) via a switch (24) and which can be charged with said discharge current, a control unit (14) which is configured to alternately switch the switch (24) on and off based on a feedback control, wherein the control unit (14) has an input interface (42) for receiving a feedback signal (ZXCS) which represents a discharge voltage of the inductor (21), wherein the control unit (14), in a DCM mode, is further configured to calculate a switch on time ($T_{on}$) of the switch (24) which is after a first local minimum of the discharge voltage, and wherein, after switching off the switch (24), the control unit is configured to: either switch on the switch (24) at a next or closest local minimum of the inductor voltage after Ton, in case Ton is less than a directly (Continued)

or indirectly set reference time ($T_{ref}$), or close the switch (24) at $T_{on}$, in case $T_{on}$ is equal to or exceeds $T_{ref}$.

17 Claims, 4 Drawing Sheets

(51) Int. Cl.
 *H05B 45/355* (2020.01)
 *H02M 1/00* (2006.01)
(58) Field of Classification Search
 CPC .. H02M 1/4225; H02M 1/425; H02M 1/0058; H02M 1/42; H02M 1/0003; H02M 1/0009
 See application file for complete search history.

(56) References Cited

U.S. PATENT DOCUMENTS

| | | | |
|---|---|---|---|
| 2013/0307497 A1* | 11/2013 | Chen | H02M 3/1563 323/235 |
| 2018/0054113 A1* | 2/2018 | Kim | H02M 1/15 |
| 2020/0144906 A1* | 5/2020 | Endo | H02M 7/219 |

OTHER PUBLICATIONS

EP19202150.9 Search Report dated Apr. 21, 2020, 7 pages.
PCT/EP2020/077850, International Search Report and Written Opinion dated Nov. 10, 2020, 6 pages.

* cited by examiner

POWER FACTOR CORRECTION CIRCUIT

CROSS REFERENCE TO RELATED APPLICATIONS

The present application is the U.S. national stage application of international application PCT/ep2020/077850 filed Oct. 5, 2020, which international application was published on Apr. 15, 2021 as International Publication WO 2021/069376 A1. The international application claims priority to European Patent Application 19202150.9 filed Oct. 9, 2019.

TECHNICAL FIELD OF THE INVENTION

The invention relates in general to a power factor correction (PFC) circuit and to a method for power factor correction. The invention further relates to a control unit for implementing the method, and to a driver for light sources, such as LEDs.

BACKGROUND OF THE INVENTION

Power factor correction (PFC) circuits are known to convert a supplied DC or AC voltage to a higher level. At the same time, such circuits can be designed to guarantee a power factor of almost 1, in which, for example, the current drawn by this circuit has a sinusoidal time curve similar to the one of the mains voltage.

Boost PFC circuits are a special type of PFC circuits. In a boost PFC circuit an inductor, such as a charging coil, is connected in series with a boost diode, whereby the connection point between the boost diode and the charging coil can selectively be connected to ground via a switch. An AC or DC voltage can be applied to the charging coil, which charges the charging coil when the switch is closed. When the switch is open, a charging capacitor is charged via the boost diode. Typically, the switch is closed again as soon as the charging coil has completely discharged, i.e. as soon as the current through the charging coil has dropped to zero. This type of operation of the PFC circuit is called borderline mode.

At low loads, it is already known to operate the PFC circuit alternatively in the so-called discontinuous conduction mode (DCM). Thereby, the switch is not switched on again immediately at the first local minimum of the voltage at the switch, respectively the first zero crossing of the corresponding current, but at a later point in time. To be more precise, the switch is not switched on again until the second or further local minimum, whereby these local minimums are caused by oscillation processes of the charging coil.

A problem now is that this particular clocking of the switch requires the detection of several zero crossings within a switch-off phase, i.e. while the switch is in an open position. However, the ringing, i.e. the oscillation, of the voltage decays over time such that after a view ringing circles it can become very difficult to properly determine the valleys in view of the decaying amplitude of the voltage.

In addition, the voltage oscillation at the charging coil is a damped oscillation, therefore the amplitude of the feedback signal detected via a secondary winding will also decrease towards a control unit following the damping. Thus, there is a risk that the maximum amplitude of the oscillation will drop below the discrimination threshold for zero crossing detection. This means that further zero crossings can no longer be detected. In extreme cases, the switch will not be switched on, i.e. closed, again.

In case no valley can be detected anymore, the PFC switch can be switched on again after a safety march in time period. However, as this safety march in time period is spaced substantially after the calculated switching on time, this leads to a fluctuation of the produced output voltage (Bus-voltage) of the PFC, which internally can lead to a visible relatively low frequency flicker in the light output of the lighting means.

Thus, it is an objective to provide an improved PFC circuit and an improved method for performing a power factor correction, which avoid the above-mentioned disadvantages.

SUMMARY OF THE INVENTION

The object of the present invention is achieved by the solution provided in the enclosed independent claims. Advantageous implementations of the present invention are further defined in the dependent claims.

According to a first aspect of the invention, a power factor correction (PFC) circuit is provided. The PFC circuit comprises an inductor which is configured to provide a discharge current, a capacitor which is connected to the inductor via a switch and which can be charged with said discharge current, a control unit which is configured to alternately switch the switch on and off based on a feedback control, wherein the control unit has an input interface for receiving a feedback signal (ZXCS) which represents a discharge voltage of the inductor being applied to the switch, wherein the control unit, in a DCM mode, is further configured to calculate a switch on time ($T_{on}$) of the switch which is after a first local minimum of the discharge voltage, and wherein, after switching off the switch, the control unit is configured to: either switch on the switch at a next or closest local minimum of the discharge voltage after $T_{on}$, in case $T_{on}$ is less than a directly or indirectly set reference time ($T_{ref}$), or close the switch at $T_{on}$, in case $T_{on}$ is equal to or exceeds $T_{ref}$. This provides the advantage that a light flicker can be prevented in case a local minimum of the discharge voltage cannot be detected.

In particular, the PFC circuit is a boost PFC circuit, in a drive for light sources, such as LEDs.

The discharge voltage refers to the voltage of the inductor at discharge. In particular, the discharge voltage refers to the discharge voltage of the inductor being applied to the switch.

The feedback signal (ZXCS) represents or corresponds to a discharge voltage and/or a discharge current being applied to the switch.

In the context of the invention, switching on the switch means making the switch conductive respectively closing the switch, and switching off the switch means making the switch non-conductive respectively opening the switch.

In an embodiment, if the switch is switched on, then a connection point between the boost diode and the inductor is connected to ground via the switch.

DCM mode refers to discontinuous conduction mode. In the DCM mode, the current through the inductor is allowed to fall to zero and to remain at zero without immediate control of the PFC switch to become conducting again. After the first zero crossing, respectively valley, of the inductor voltage, the inductor voltage is not immediately statically zero, rather there is an ongoing decaying ringing of the voltage.

In DCM mode, a local minimum of the discharge voltage generally coincides with a zero crossing, in particular a positive zero crossing, of the corresponding discharge current. In this context, the terms local minimum, or valley, of the discharge voltage and the term (positive) zero crossing of the discharge voltage can be used synonymously.

In a preferred embodiment, the PFC circuit further comprises a boost diode which is connected to the inductor in series.

In a preferred embodiment, the control unit is configured to determine the local minimum of the discharge voltage based on the feedback signal (ZXCS). This provides the advantage that the local minimum of the discharge voltage can be determined efficiently.

In particular, the control unit is configured to determine the local minimum of the discharge voltage when the feedback signal (ZXCS) falls below a threshold value.

In a preferred embodiment, the control unit is configured to detect the local minimum of the discharge voltage at a positive zero crossing of the discharge current. This provides the advantage that the local minimum of the discharge voltage can be determined efficiently.

In a preferred embodiment, the control unit is configured to calculate the switch on time ($T_{on}$) during a closing phase of the switch.

In a preferred embodiment, the control unit comprises a processing unit for analyzing the feedback signal (ZXCS) and/or calculating the switch on time ($T_{on}$). In particular, the switch on time ($T_{on}$) is calculated based on the feedback signal (ZXCS).

In a preferred embodiment, the control unit comprises an output interface for controlling the switch. This allows for an efficient control of the switch.

For instance, the output interface provides a voltage for switching the switch on or off, in particular if the switch is a transistor.

In a preferred embodiment, the control unit comprises a restart timer which is configured to switch on the switch at a set time limit after switching off the switch, wherein the reference time ($T_{ref}$) is less than the time limit of the restart timer. This provides the advantage that light flicker can be prevented, since a switch on at $T_{ref}$ is always earlier than a switch on by the restart timer.

In a preferred embodiment, the reference time ($T_{ref}$) is less than 300 µs, in particular less than 100 µs, more particular less than 50 µs, even more particular less than 25 µs.

In a preferred embodiment, the switch is a transistor, in particular a power transistor, a field effect transistor (FET) or a MOSFET. This provides the advantage that the switch can be efficiently be controlled by the control unit.

According to a second aspect of the invention, a driver for light sources, in particular for LEDs, is proposed, which comprises a PFC circuit according to the first aspect of the invention. This provides the advantage that a light flicker can be prevented in case a local minimum of the discharge voltage cannot be detected.

According to a third aspect of the invention, a method for power factor correction (PFC) by means of a PFC circuit, in particular the PFC circuit according to the first aspect of the invention, is proposed, wherein the PFC circuit comprises an inductor which is configured to provide a discharge current, a capacitor which is connected to the inductor via a switch and which can be charged with said discharge current, wherein the switch is alternately switched on and off. The method comprises the steps of: receiving a feedback signal (ZXCS), wherein the feedback signal (ZXCS) represents a discharge voltage of the inductor, calculating a switch on time ($T_{on}$) of the switch which is after a first local minimum of the discharge voltage, and after switching off the switch, either switch on the switch at a next or closest local minimum of the discharge voltage after $T_{on}$, in case $T_{on}$ is less than a directly or indirectly set reference time ($T_{ref}$), or switch on the switch at $T_{on}$, in case Ton is equal to or exceeds $T_{ref}$. This provides the advantage that a light flicker can be prevented in case a local minimum of the discharge voltage cannot be detected.

According to a fourth aspect of the invention, a control unit for implementing the method according to the third aspect of the invention is proposed.

In a preferred embodiment, the control unit has an input interface for receiving the feedback signal (ZXCS) and/or an output interface for controlling the switch.

In a preferred embodiment, the control unit is implemented as a micro controller, an ASIC or a hybrid solution.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The invention will be explained in the followings together with the figures.

DETAILED DESCRIPTION OF THE PREFERRED EMBODIMENTS

Figure 1:
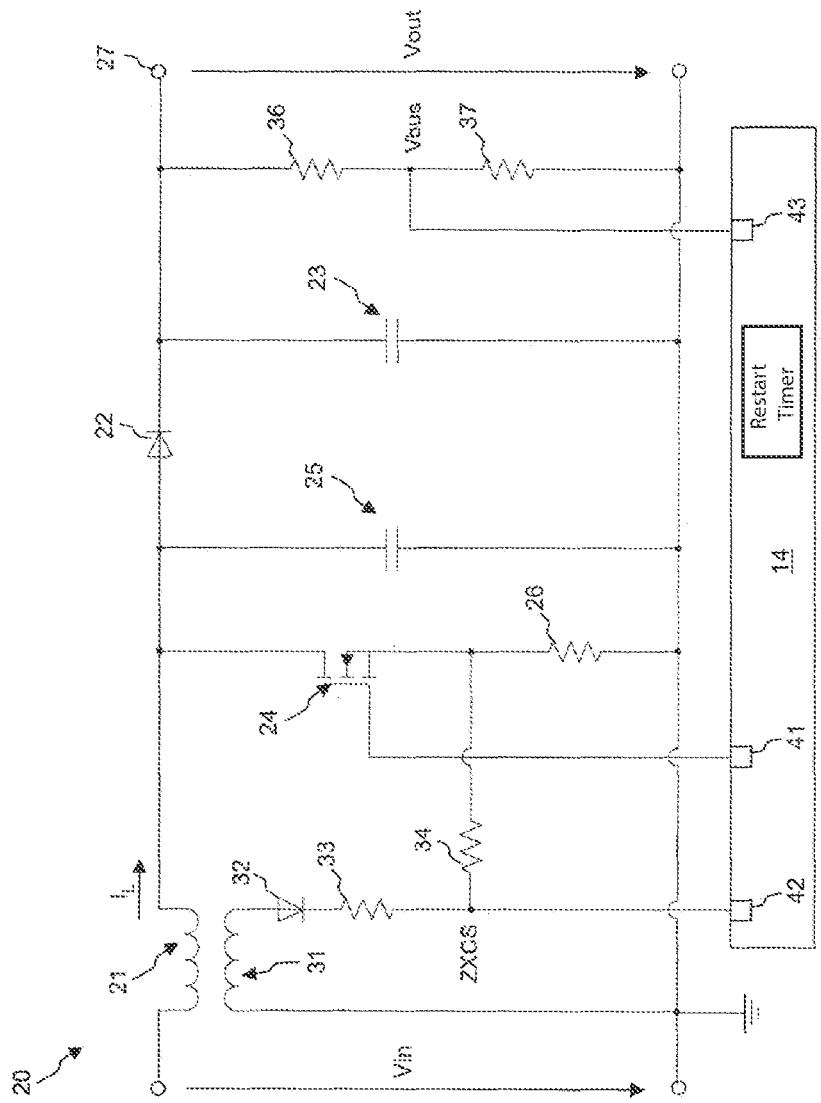
FIG. 1 shows a schematic diagram of a PFC circuit according to an embodiment of the invention.

Aspects of the present invention are described herein in the context of a PFC circuit.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

FIG. 1 shows a power factor correction (PFC) circuit 20 according to an embodiment.

The PFC circuit 20 comprises an inductor 21 which is configured to provide a discharge current, a capacitor 23 which is connected to the inductor 21 via a switch 24 and which can be charged with said discharge current, a control unit 14 which is configured to alternately switch the switch 24 on and off based on a feedback control, wherein the control unit 14 has an input interface 42 for receiving a feedback signal (ZXCS) which represents a discharge voltage of the inductor being applied to the switch 24.

The control unit 14, in a DCM mode, can be configured to calculate a switch on time ($T_{on}$) of the switch 24 which is after a first local minimum of the discharge voltage.

After switching off the switch 24, the control unit can be configured to either switch on the switch 24 at a next or closest local minimum of the inductor voltage after $T_{on}$, in case $T_{on}$ is less than a directly or indirectly set reference time ($T_{ref}$), or close the switch 24 at $T_{on}$, in case $T_{on}$ is equal to or exceeds $T_{ref}$.

The discharge voltage refers to the voltage of the inductor at discharge. In particular, the discharge voltage refers to the discharge voltage of the inductor being applied to the switch 24.

The PFC circuit 20 can be supplied with an input voltage $V_{in}$ e.g. in the form of an AC or DC voltage. The input voltage $V_{in}$ can be a rectified mains voltage from a rectifier (not shown).

As output, the power factor correction circuit 20 can provide an output voltage which is a DC voltage. The output voltage $V_{out}$ can be used to supply a load to which the power factor correction circuit 20 is connected. The load can, for example, be a component of a control gear for a light source such as a fluorescent lamp, a halogen lamp, a light-emitting diode (LED) arrangement, etc.

The input, respectively output, of the PFC circuit 20 can each be formed by an input terminal, respectively output terminal 27, and ground.

The input voltage $V_{in}$ can be applied to a first terminal of the inductor 21 which can be a charging coil.

The PFC circuit 20 can further comprises a boost diode 22 which is connected to a second terminal of the inductor 21. The capacitor 23 can be connected between the anode of the boost diode 22 and ground, and can thus be charged by the discharge current of the inductor 21 via the diode 22.

The switch 24 can be a transistor, in particular a power transistor, a field effect transistor (FET) or a MOSFET.

In an embodiment, when the switch 24 is switched on, the inductor 21 is connected to ground via the switch 24, whereby the diode 22 is blocking, so that the inductor 21 is charged. If the switch 24 is switched off the diode 22 is conductive, so that the inductor 21 can be discharged via the diode 22 into the charging capacitor 23.

In FIG. 1, the inductor 21 is a charging coil that forms the primary winding of a transformer. A detection coil 31 forms the secondary winding of this transformer. The charging coil and the detection coil 31 are inductively coupled so that the current through the charging coil or the voltage at the charging coil can inductively be tapped by the control unit 14 at the input interface 42.

Accordingly, a resistor 33 and a diode 32 are provided. One terminal of the detection coil 31 is connected to ground, the other terminal of the detection coil 31 to the anode of the diode 32. The resistor 33 is connected between the cathode of the diode 32 and the input interface 42 of the control unit 14.

In an embodiment, while the switch 24 is switched off, the local minimum of the voltage via the inductor 21 or the (positive) zero crossing of the current ($I_L$) flowing through the inductor 21 can be detected at the input interface 42. This detection of the voltage at the inductor 21 also indirectly detects the voltage at the switch 24.

In an embodiment, while the switch 24 is switched on, the current through the switch can be measured at the input interface 42 via a measuring resistor 26. This preferably low-impedance measuring resistor 26 is connected between ground and the switch 24, so that, when the switch 24 is switched on, a current flows through the inductor 21, the switch 24 and the measuring resistor 26.

In the exemplary embodiment of FIG. 1, another resistor 34 connects the input interface 42 and the connection point between the measuring resistor 26 and the switch 24.

A further capacitor 25 can be connected between inductor 21 and ground, which is connected in parallel to a series circuit consisting of the switch 24 and the resistor 26. The capacitor 25 can be connected to the same terminal of the diode 22 as the inductor 21.

The PFC circuit 20 further has an output interface 41 that is connected to the switch, in particular to a gate of the switch, for controlling the switch 24.

The control unit 14 can have a further input interface 43 for recording further variables. For example, the control unit 14 can detect the output voltage in form of a bus voltage $V_{bus}$ via a voltage divider with resistors 36, 37.

Figure 2:
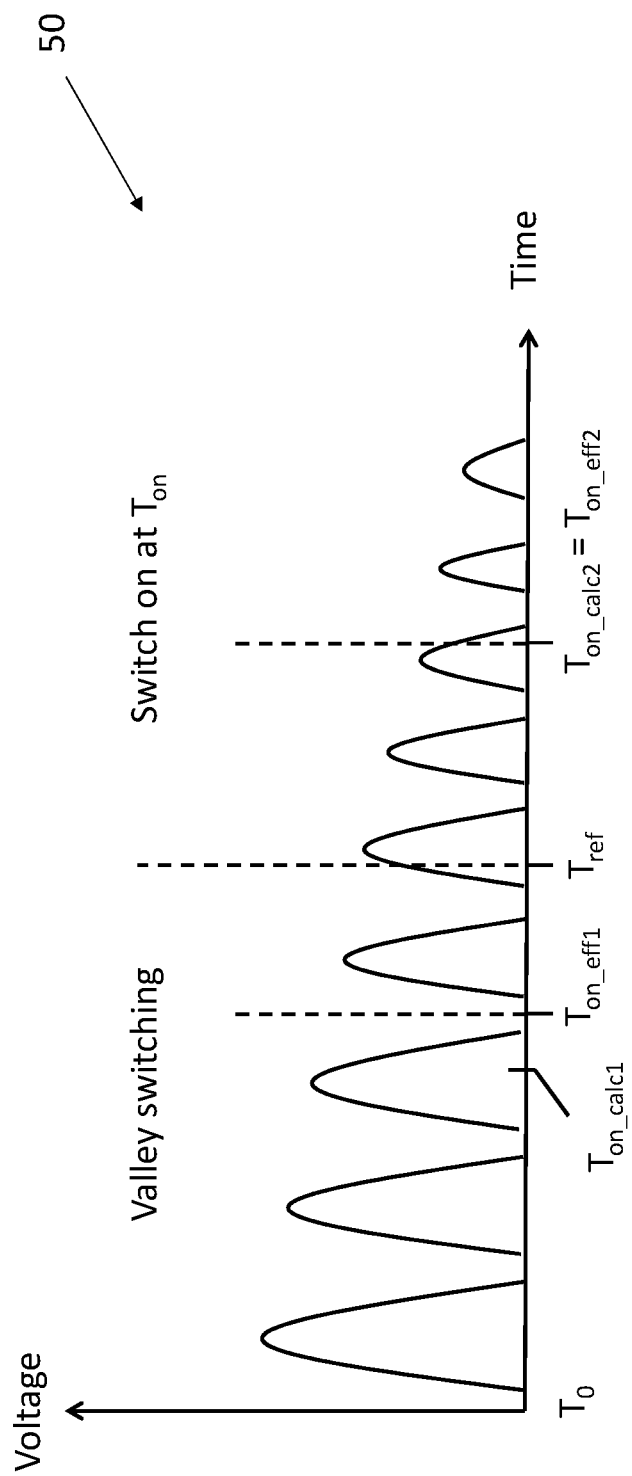
FIG. 2 Shows a schematic plot of a voltage signal occurring in the circuit according to an embodiment of the invention.

FIG. 2 shows a schematic plot 50 of a voltage signal occurring in the circuit according to an embodiment.

The voltage in FIG. 2 is the fluctuating, or ringing, discharge voltage after switching off the switch 24 at time $T_0$.

FIG. 2 shows the switching with two different calculated switch on times $T_{on\_calc1}$ and $T_{on\_calc2}$, wherein $T_{on\_calc1}<T_{ref}$ and $T_{on\_calc2}>T_{ref}$, and wherein $T_{ref}$ is the directly or indirectly set reference time.

In a first time period region of the ringing voltage, which is before the reference time $T_{ref}$, the so-called valley switching can be performed. This means, that if a calculated switch on time $T_{on\_calc1}$ falls in this time period, then the switch 24 is not switched on at $T_{on\_calc1}$. Instead, it is switched on at $T_{on\_eff1}$, wherein $T_{on\_eff1}$ is the time of the next or closest valley to $T_{on\_calc1}$, and wherein often $T_{on\_calc1} \neq T_{on\_eff1}$.

In a second time period region of the ringing voltage, which is after $T_{ref}$, the valley switching can be deactivated. A calculated switch on time $T_{on\_calc2}$, which falls in this time period, is directly applied to the actual switch on operation of the switch 24, i.e $T_{on\_calc2}=T_{on\_eff2}$. The switching at $T_{on\_calc2}$ is done if $T_{on\_calc2} \geq T_{ref}$, regardless of whether the discharge voltage at $T_{on\_calc2}$ is in a valley or not.

This "adaptive valley switching" can prevent lost valley detection due to low signals. The PFC circuit 20 does no longer rely on a restart timer, that switches the PFC switch back on after a safety march in time period, which is much longer than the calculated switch on time $T_{on}$. The use of such a restart timer can lead to visible low frequency flicker in the light output of a lighting means supplied by a converter stage, which supplied by the output or bus voltage. However, a restart timer can still be implemented in the PFC circuit 20 as a safety measure.

The reference time can be less than 300 μs, 100 μs, 50 μs or 25 μs. In particular, the reference time, is less than the time limit of a restart timer.

The control unit 14 can calculate the switch on time (Ton), in particular during a closing phase of the switch 24. The control unit can comprise a processing unit for calculating $T_{on}$, e.g. based on the feedback signal (ZXCS).

Figure 3:
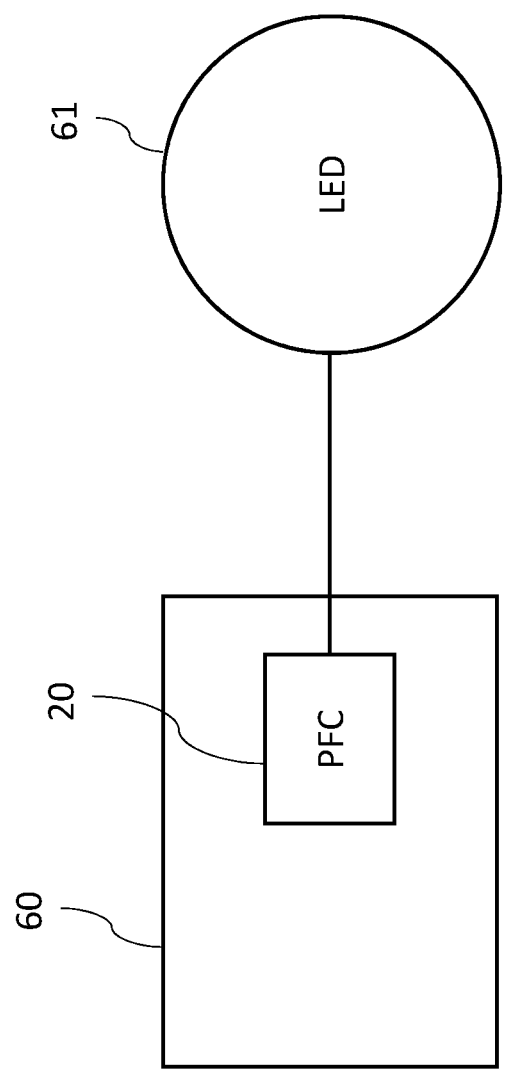
FIG. 3 shows a schematic diagram of a driver for light sources according to an embodiment of the invention.

FIG. 3 shows a schematic diagram of a driver 60 for light sources 61, such as LEDs, according to an embodiment.

The driver 60 comprises the PFC circuit 20, for instance the PFC circuit 20 as depicted in FIG. 1.

The driver can be an electrical ballast for an LED converter or for a fluorescent lamp.

Figure 4:
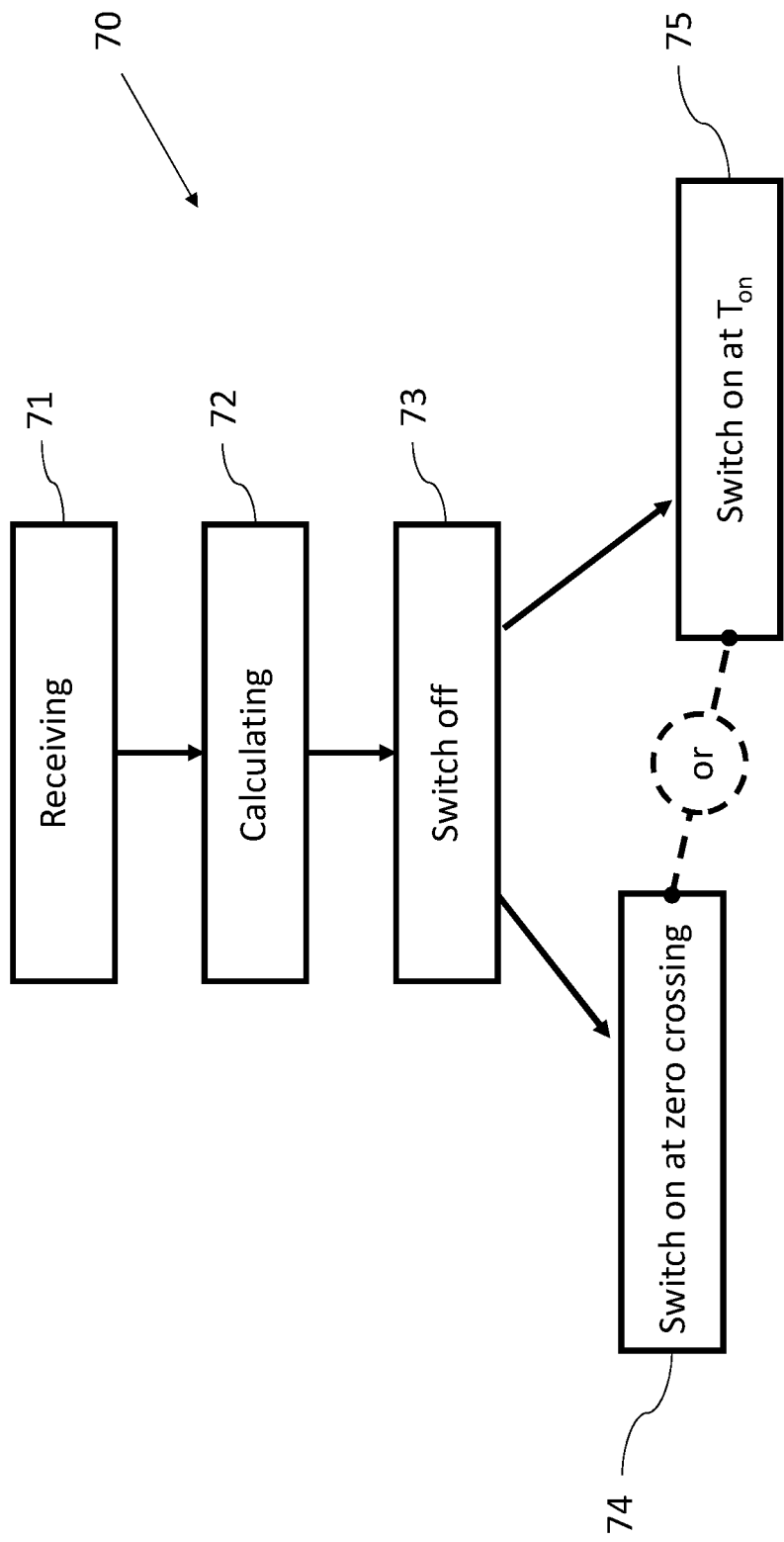
FIG. 4 shows a schematic diagram of a method for power factor correction according to an embodiment of the invention.

FIG. 4 shows a schematic diagram of a method 70 for power factor correction according to an embodiment of the invention.

The method 70 can be performed by a PFC circuit 20, in particular the PFC circuit of FIG. 1, wherein the PFC circuit 20 comprises an inductor 21 which is configured to provide a discharge current, a capacitor 23 which is connected to the inductor 21 via a switch 24 and which can be charged with said discharge current, wherein the switch 24 is alternately switched on and off.

The method 70 comprises the steps of: receiving 71 a feedback signal (ZXCS), wherein the feedback signal (ZXCS) represents a discharge voltage of the inductor, calculating 72 a switch on time ($T_{on}$) of the switch 24, which is after a first local minimum of the discharge voltage, and after switching off 73 the switch 24, either switch on 74 the switch 24 at a next or closest local minimum of the discharge voltage after $T_{on}$, in case Ton is less than a directly or indirectly set reference time ($T_{ref}$), or switch on 75 the switch 24 at $T_{on}$, in case $T_{on}$ is equal to or exceeds $T_{ref}$.

The step of calculating 72 $T_{on}$ and/or the step of receiving 71 the feedback signal can be performed each before or after the switch off 73 of the switch 24.

The control unit 14 as shown in FIG. 1 can perform the method 70 shown in FIG. 4.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. A power factor correction (PFC) circuit, comprising:
an inductor which is configured to provide a discharge current;
a boost diode which is connected to the inductor in series;
a switch connected on one side between the inductor and the boost diode and connected to ground on the other side;
a capacitor which is connected to the inductor and the boost diode and which can be charged with said discharge current from the inductor through the boost diode;
a detection circuit that provides a feedback signal representing a discharge voltage of the inductor;
a control unit which is configured to alternately switch the switch on and off;
wherein the control unit has an input interface for receiving a feedback signal which represents the discharge voltage of the inductor,
wherein the control unit, in a discontinuous conduction mode (DCM), is further configured to calculate a calculated switch on time ($T_{ON\_CALC}$) of the switch which is after a first local minimum of the discharge voltage of the inductor, and
wherein, after switching off the switch, the control unit is configured to:
a) either switch on the switch at a next or closest local minimum of the discharge voltage of the inductor after the calculated switch on time ($T_{ON\_CALC}$), in case the calculated switch on time ($T_{ON\_CALC}$) is less than a directly or indirectly set reference time ($T_{ref}$),
b) or close the switch at the calculated switch on time ($T_{ON\_CALC}$), in case the calculated switch on time ($T_{ON\_CALC}$) is equal to or exceeds said directly or indirectly set reference time ($T_{ref}$).

2. The PFC circuit according to claim 1, wherein the control unit is configured to determine the local minimum of the discharge voltage based on the feedback signal.

3. The PFC circuit according to claim 2, wherein the control unit is configured to detect the local minimum of the discharge voltage at a positive zero crossing of the discharge current.

4. The PFC circuit according to claim 1, wherein the control unit is configured to calculate the calculated switch on time ($T_{ON\_CALC}$) during a closing phase of the switch.

5. The PFC circuit according to claim 1, wherein the control unit comprises a processing unit for analyzing the feedback signal and calculating the calculated switch on time ($T_{ON\_CALC}$).

6. The PFC circuit according to claim 1, wherein the control unit comprises an output interface for controlling the switch.

7. The PFC circuit according to claim 1, wherein the control unit comprises a restart timer which is configured to switch on the switch at a set time limit after switching off the switch, wherein the reference time ($T_{ref}$) is less than the time limit of the restart timer.

8. The PFC circuit according to claim 1, wherein the reference time ($T_{ref}$) is less than 300 μs.

9. The PFC circuit according to claim 1, wherein the switch is a transistor, in particular a power transistor, a field effect transistor (FET) or a metal oxide semiconductor field effect transistor (MOSFET).

10. The PFC circuit according to claim 1, wherein the PFC circuit is part of a driver circuit for driving light sources including a plurality of LEDs.

11. A method for performing a power factor correction (PFC) by means of a PFC circuit, wherein the PFC circuit comprises an inductor which is configured to provide a discharge current, a boost diode which is connected to the inductor in series; a switch connected on one side between the inductor and the boost diode and connected to ground on the other side, a capacitor which is connected to the inductor and the boost diode and which can be charged with said discharge current from the inductor through the boost diode, wherein the switch is alternately switched on and off, the method comprising the steps of:

receiving a feedback signal, wherein the feedback signal represents a discharge voltage of the inductor, calculating a calculated switch on time ($T_{ON\_CALC}$) of the switch which is after a first local minimum of the discharge voltage of the inductor, and after switching off the switch:

a) either switch on the switch at a next or closest local minimum of the discharge voltage of the inductor after the calculated switch on time ($T_{ON\_CALC}$), in case the calculated switch on time ($T_{ON\_CALC}$) is less than a directly or indirectly set reference time ($T_{ref}$), b) or switch on the switch at the calculated switch on time the ($T_{ON\_CALC}$), in case the calculated switch on time ($T_{ON\_CALC}$) is equal to or exceeds ($T_{ref}$).

12. The method according to claim 11, wherein the PFC circuit further comprises a control unit to alternately switch the switch on and off.

13. The method according to claim 12, wherein the control unit has an input interface for receiving the feedback signal and an output interface for controlling the switch.

14. The method according to claim 12, wherein the control unit is implemented as a micro controller, an application specific integrated circuit (ASIC) or a hybrid solution.

15. The PFC circuit according claim 1 wherein the reference time ($T_{ref}$) is less than 100 µs.

16. The PFC circuit according claim 1 wherein the reference time ($T_{ref}$) is less than 50 µs.

17. The PFC circuit according claim 1 wherein the reference time ($T_{ref}$) is less than 25 µs.

* * * * *